(12) United States Patent
Jones et al.

(10) Patent No.: US 6,739,359 B2
(45) Date of Patent: *May 25, 2004

(54) ON-BOARD INERT GAS GENERATING SYSTEM OPTIMIZATION BY PRESSURE SCHEDULING

(75) Inventors: Philip E. Jones, Naples, FL (US); Richard E. Scott, Naples, FL (US)

(73) Assignee: Shaw Aero Devices, Inc., Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/308,972

(22) Filed: Dec. 3, 2002

(65) Prior Publication Data

US 2004/0065383 A1 Apr. 8, 2004

Related U.S. Application Data

(60) Provisional application No. 60/416,176, filed on Oct. 4, 2002.

(51) Int. Cl.$^7$ .................................................. B65B 1/04
(52) U.S. Cl. .......................... 141/64; 141/1; 244/135 R
(58) Field of Search ................................ 141/1, 62, 63, 141/64, 94, 95, 198; 244/135 R; 96/4–9

(56) References Cited

U.S. PATENT DOCUMENTS

| 3,776,164 A | 12/1973 | Westrum |
| 4,378,920 A | 4/1983 | Runnels et al. |
| 4,556,180 A | 12/1985 | Manatt |
| 5,069,692 A | 12/1991 | Grennan et al. |
| 5,131,225 A | 7/1992 | Roettger |
| 5,918,679 A | 7/1999 | Cramer |
| 6,012,533 A | 1/2000 | Cramer |
| 6,343,465 B1 | 2/2002 | Martinov |

*Primary Examiner*—Steven O. Douglas
(74) *Attorney, Agent, or Firm*—Morgan, Lewis & Bockius LLP (57) ABSTRACT

A modular, on-board, inert gas generating system for aircraft is disclosed in which main components such as a heat exchanger, filter, and an air separation module, and a pressure scheduling valve are provided in a modular unit sized to provide a variable flow of nitrogen-enriched air to the aircraft spaces to be inerted. For different inert gas requirements, for example in larger aircraft, multiple modular units may be provided without redesigning the basic system. A method for inerting fuel tanks, cargo holds and other void spaces using the modular approach and pressure scheduling valve is also disclosed.

29 Claims, 12 Drawing Sheets

ON-BOARD INERT GAS GENERATING SYSTEM OPTIMIZATION BY PRESSURE SCHEDULING

The patent claims priority pursuant to 35 U.S.C. § 119(e)1 to U.S. Provisional Patent Application Serial No. 60/416,176 filed Oct. 4, 2002.

BACKGROUND OF THE INVENTION

1. Field of the Invention

This invention relates to a method and apparatus for improving aircraft safety. More specifically, it relates to an apparatus and method for preventing combustion in aircraft fuel tanks and cargo spaces by supplying inert gas at flow rates determined by a pressure scheduling valve.

2. Description of the Related Art

Military aircraft have used On-board Inert Gas Generating Systems (OBIGGS) for some years to protect against fuel tank explosions due to undesired phenomena, such as penetration from small arms fire. Military aircraft are not the only aircraft that would benefit from OBIGGS. For example, investigations into the cause of recent air disasters have concluded that unknown sources may be responsible for fuel tank ignition and explosion. Subsequently, OBIGGS has been evaluated as a way to protect commercial aircraft against such fuel tank explosions started by unknown ignition sources.

OBIGGS protects against fuel tank explosions by replacing the potentially explosive fuel/air mixture above the fuel in the tanks (the ullage) with an inert gas (usually nitrogen—$N_2$). The nitrogen is generated by separating oxygen from local, ambient air and pumping the inert product into the tanks.

In previous applications, OBIGGS has proved relatively unreliable, heavy, and costly for both initial acquisition and operation in aircraft. Furthermore, military aircraft systems often have the strict requirements that derive from military flight profiles that include high-rate descent from high-altitude flight. Applications of OBIGGS to commercial aircraft would benefit by considering the fact that a typical flight profile for the commercial application has a less demanding requirement for the system because commercial aircraft do not operate under the same conditions of military aircraft.

Thus, there is a need for a gas generation and inerting system that minimizes the quantity and complexity of sub-components (particularly moving parts). The system should also consider a typical commercial aircraft flight profile and take advantage of the reduced descent rates (compared to military aircraft).

SUMMARY OF THE INVENTION

The present invention provides an apparatus and method for reducing the possibility of combustion in aircraft fuel tanks by replacing air in the ullage of the fuel tank with an inert gas that has been separated from the engine bleed air. The apparatus includes an air separation module, a filter, a heat exchanger, and a pressure scheduling valve. In one preferred embodiment, a single housing contains at least the air separation module, filter, heat exchanger, and pressure scheduling valve. The air separation module can be mounted in a center-section of the housing, may be a canister-type design, may include a replaceable cartridge, and may be a hollow-fibre permeable membrane configuration.

The method of the present invention includes displacing the atmosphere in the ullage of a fuel tank with a non-combustible gas. In one preferred embodiment, the pressure scheduling valve taps into the pressure of the air supplied to the air separation module. Based on this pressure the pressure scheduling valve adjusts a variable orifice so that the system introduces a non-combustible gas to the ullage at a variable flow rate and variable purity level. The flow rate and purity level range from a high-purity non-combustible gas at a low flow rate when the supplied air pressure is relatively high, to a lower-purity noncombustible gas at a higher flow rate when the supply pressure is relatively low. In an embodiment of the invention, the pressure scheduling valve taps into the pressure of the nitrogen-enriched air discharged from the air separation module and bases the variable orifice adjustments on pressure of the nitrogen-enriched air. In one embodiment of the invention the non-combustible gas is generated from aircraft engine bleed air. Preferably, the introduction of high-purity non-combustible gas occurs during take-off and level flight of an airplane and introduction of the lower-purity gas occurs during descent of the airplane.

BRIEF DESCRIPTION OF THE SEVERAL VIEWS OF THE DRAWINGS

The foregoing and other aspects and advantages of the present invention will be better understood from the following detailed description when read in conjunction with the drawings, in which.

Like numerals refer to similar elements throughout the several drawings.

DETAILED DESCRIPTION OF THE PREFERRED EMBODIMENTS

Figure 1:
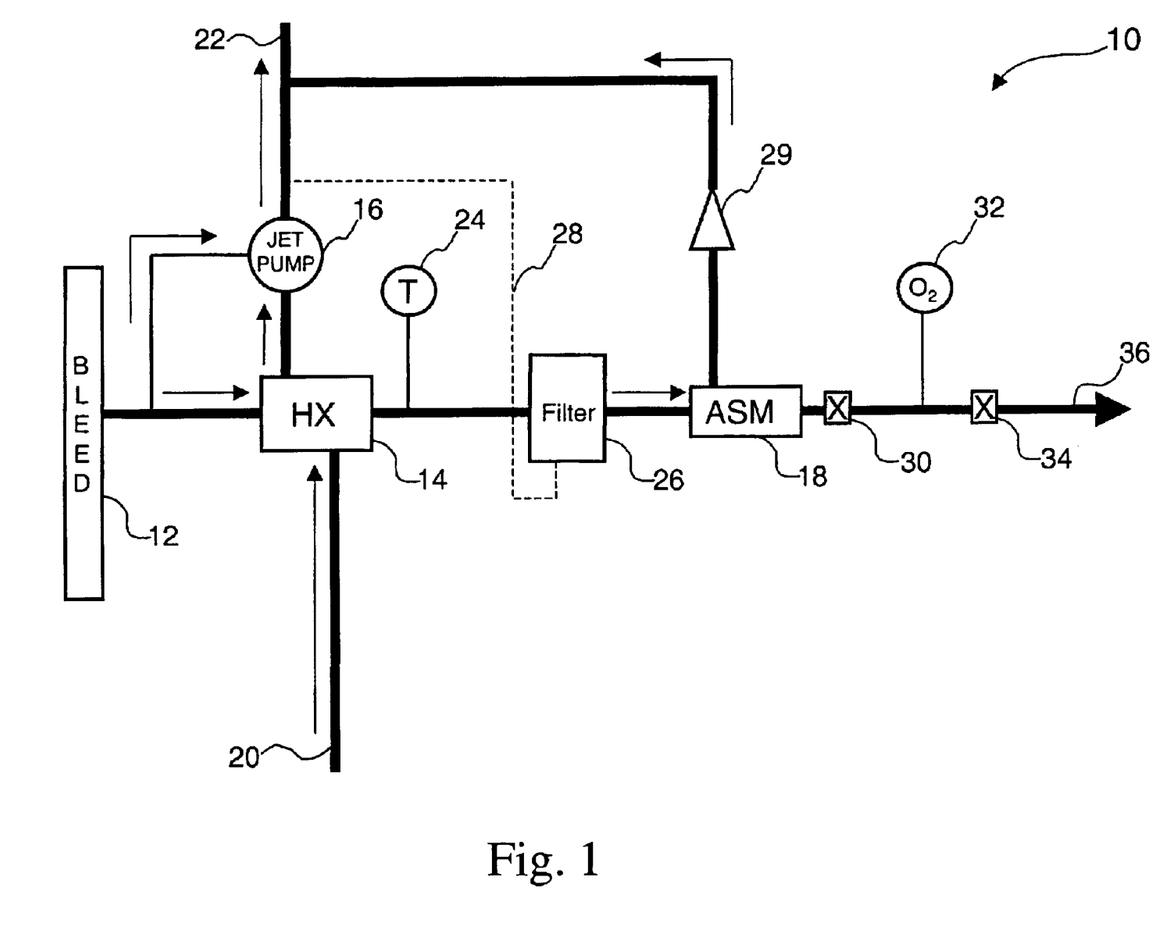
FIG. 1 is a schematic view of one embodiment of a modular on-board inert gas generating system according to the present invention.

As illustrated in FIG. 1, system 10 according to one embodiment of the invention uses aircraft engine bleed air 12 that is supplied under conditions of elevated temperature and elevated pressure to generate gas for inerting aircraft fuel tanks. It will be appreciated by persons skilled in the art that the present invention is equally useful for inerting cargo holds and other void spaces. Engine bleed air is typically supplied from taps in the turbine section of the aircraft engines at temperatures in the range of 300° F.–400° F. and at pressures in the range of 10–45 psig depending on turbine rotation speed. It is typically used as a utility source of pressurized air on board aircraft. System 10 operates whenever bleed air is available and, thus, avoids the use of compressors or complex control valves.

Bleed air 12 is introduced at one end of system 10 and nitrogen-enriched air (NEA) is produced from the other end. Bleed air 12 flows under pressure and temperature to heat exchanger 14. A branch passage taps off a small portion of the pressurized bleed air to power jet pump 16. For efficient operation, depending on size, air separation module (ASM) 18 requires input air temperature in the range of less than 200° F. Heat exchanger 14 is therefore used to control the temperature of the engine bleed air fed into ASM 18. Secondary cooling flow 20 is provided to heat exchanger 14 for this purpose. Jet pump 16 may be utilized to provide the cooling flow, which is vented overboard at outlet 22. If desired, temperature sensor 24 may be positioned down stream of the heat exchanger to monitor output temperature and control secondary flow 20 and/or jet pump 16 based on the monitored temperature.

The pressurized air flow from heat exchanger 14 enters filter 26. Filter 26 may comprise multiple filters, such as a coalescing filter to remove particulate contaminants and moisture, and a carbon filter for removing hydrocarbons. Filter drainpipe 28 drains removed moisture and directs it overboard at outlet 22.

After leaving filter 26, the conditioned air enters ASM 18. Preferably ASM 18 provides a total flow in the range of approximately 2–4 lbs./min., with a pressure drop of a few psig. Depending on aircraft requirements or other system limitations, other sizes of ASM may be selected. Using conventional hollow-fiber technology, ASM 18 separates the air into oxygen-enriched air (OEA) and nitrogen-enriched air (NEA). In a preferred embodiment, the ASM provides nitrogen-enriched air at flow rates between about 0.5 lbs./min. up to about 2 lbs./min. At the lower flow rates a greater nitrogen purity can be achieved, with oxygen making up only about one percent by volume of the nitrogen-enriched air. At higher flow rates the oxygen content of the nitrogen-enriched air is typically about nine to ten percent by volume. Oxygen-enriched air is piped from ASM 18 overboard through outlet 22. Check valve 29 is provided in the overboard OEA line to prevent back-flow. Nitrogen-enriched air produced by ASM 18 is directed to the fuel tank and/or cargo hold. Orifice 30 is preferably provided downstream of ASM 18 to control the flow rate through the ASM. If desired, a stepped or variable orifice may be provided to control flow rate as described in greater detail below. Optional oxygen sensor 32 may be configured to provide signals representing oxygen content of the NEA and may be utilized for orifice control. Another optional sensor that may be provided is mass air flow sensor 34. This may be an automotive-style hot wire mass-flow sensor. System outlet 36 directs the NEA to the fuel tank ullage and optionally to aircraft cargo hold as desired.

Figure 2:
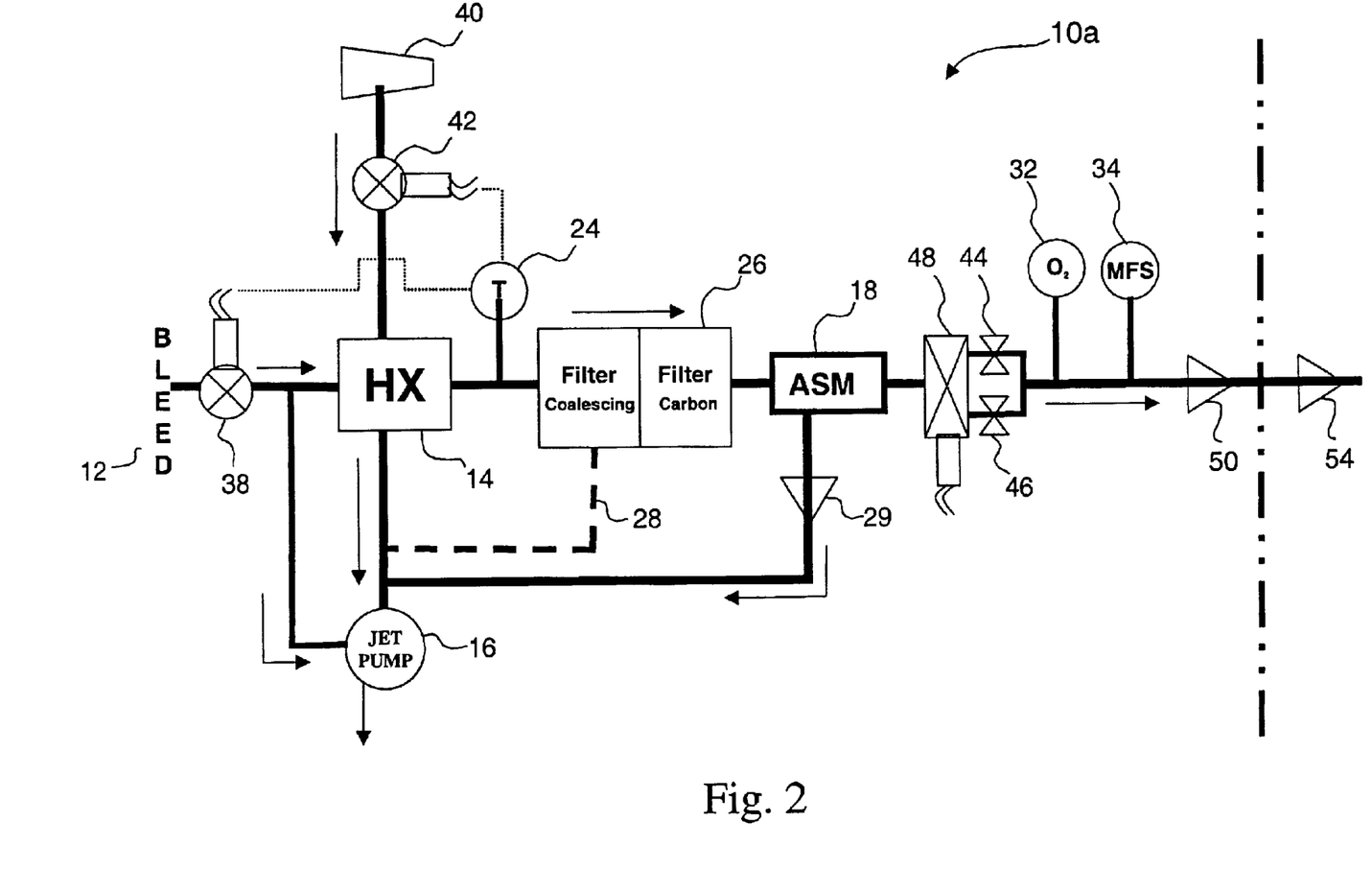
FIG. 2 is a schematic view of an alternative embodiment of the invention.

In an alternative embodiment illustrated in FIG. 2, engine bleed air first passes through an isolation valve 38. Isolation valve 38 permits system 10a to be isolated from the bleed air and, if desired, may be controlled by signals from temperature sensor 24. In this embodiment secondary cooling air is provided by an NACA scoop 40. A ram air scoop may also be employed to provide secondary cooling air. Secondary cooling air passes through temperature modulation valve 42, which also may be controlled by temperature sensor 24. Alternatively, temperature control of the primary bleed air flow may be achieved through a modulated by-pass flow arrangement (described in detail with reference to FIG. 2A). Secondary cooling air obtained from scoop 40 typically will have a temperature ranging from about −60° F. to 110° F. or greater, depending on the environmental conditions experienced by the aircraft. The secondary air flow again passes through heat exchanger 14, optionally assisted by jet pump 16. Operation of filter 26 and ASM 18 is essentially as described above. In this exemplary embodiment, an orifice is provided with two steps or as a stepped choke valve. For example, a first orifice 44 presents an opening of a first size and second orifice 46 presents an opening of a second size. The orifice seen by the NEA flow is determined by orifice selector 48, which may be a solenoid actuated valve. The orifice selector is utilized to control the flow rate as described below. NEA exiting the system optionally passes through a first check valve 50, after which it is directed through the fuel tank or cargo hold bulkhead 52. A second check valve 54 may be provided before the NEA is injected into the fuel tank or cargo hold.

The embodiments of the present invention as described above take advantage of characteristics of ASM 18 to produce higher purity NEA (lower $O_2$ content) when flow is restricted. Flow may be restricted using down stream orifices or back pressure. In the embodiments utilizing the variable orifices, preferably two different restrictions are used. Other numbers might be used if warranted by system performance and requirements. A high restriction provides low flow and high purity, and a low restriction provides a higher flow and low purity. These embodiments rely on existing aircraft vent systems to provide normal tank inward and outward venting while mixing the NEA in the tank ullage or cargo hold space. A high NEA outlet purity combined with a longer flow time will result in an ullage gas with a higher NEA purity. During the climb and cruise portion of a flight, the high purity (low flow) NEA is delivered to the fuel tank. This stores a high nitrogen concentration gas in the fuel tank ullage. During the descent portion of the flight, in which more air vents into the fuel tank as altitude decreases, the orifice is set to provide a lower restriction and higher flow, thus producing a lower purity NEA but at greater volume. Because high purity NEA is already stored in the fuel tank ullage, however, air forced in through tank vents during descent simply serves to decrease the nitrogen purity. When supplemented by the high flow low purity NEA provided during descent, the ullage maintains a nitrogen purity sufficient to maintain the inert condition. Given the typical commercial flight profile, although the nitrogen level decreases during aircraft descent, with an appropriately sized system the nitrogen levels can be maintained at an inert level through aircraft landing.

In further alternative embodiments, the system of the present invention may be designed to eliminate components such as sensors, variable orifices and the jet pump, thereby further simplifying the system and increasing reliability. In one embodiment, orifices 44 and 46, and selector valve 48 are eliminated by sizing the system to meet extreme operating conditions at all times. This may be accomplished by sizing the system to provide sufficient NEA during climb and cruise operation, so that the oxygen level in the ullage remains at below a critical level during descent and landing. Typically, the critical oxygen level will be less than about 10%–14% oxygen, more particularly less than about 12% oxygen. For example, if a system using the multiple orifices as described above were sized to provide NEA at 0.5 lbs/min with 1% oxygen curing climb and cruise, in eliminating the orifices the system may be sized to provide NEA continuously with about 2% oxygen at a slightly higher flow rate. Factors considered include fuel tank size and aircraft flight profile. The system is then designed to, in effect, store high purity NEA in the fuel tank ullage so that upon inflow of air during descent the critical oxygen level is not exceeded before aircraft operation ceases after landing.

In another embodiment, jet pump 16 may be eliminated by sizing the system to rely only on ram air from scoop 40 for secondary cooling flow. This has the advantage of further simplifying the system by removing another component. This advantage must be balanced with the need for additional ground service equipment to provide cooling for testing and maintenance when the aircraft is not in flight.

Another variation involves the removal of temperature sensor 24 and temperature modulation valve 42. In this embodiment, a maximum hot temperature is assumed based on the expected operating conditions. In typical commercial flight profiles this would be about 200° F. ASM 18 is then sized to provide the required purity of NEA based on an input temperature at the assumed maximum.

With the system sized to produce a minimum known NEA flow and purity, additional sensors such as oxygen sensor 32 and mass flow sensor 34 also may be eliminated. These alternatives for reducing system complexity may be employed alone or in any combination. Exact sizing of the system in the various alternatives described will depend upon the inerting needs and flight profile of the particular aircraft in which the system is to be mounted. A person of ordinary skill in the art will be able to match the system to the aircraft inerting needs based on the disclosure contained herein.

Figure 2A:
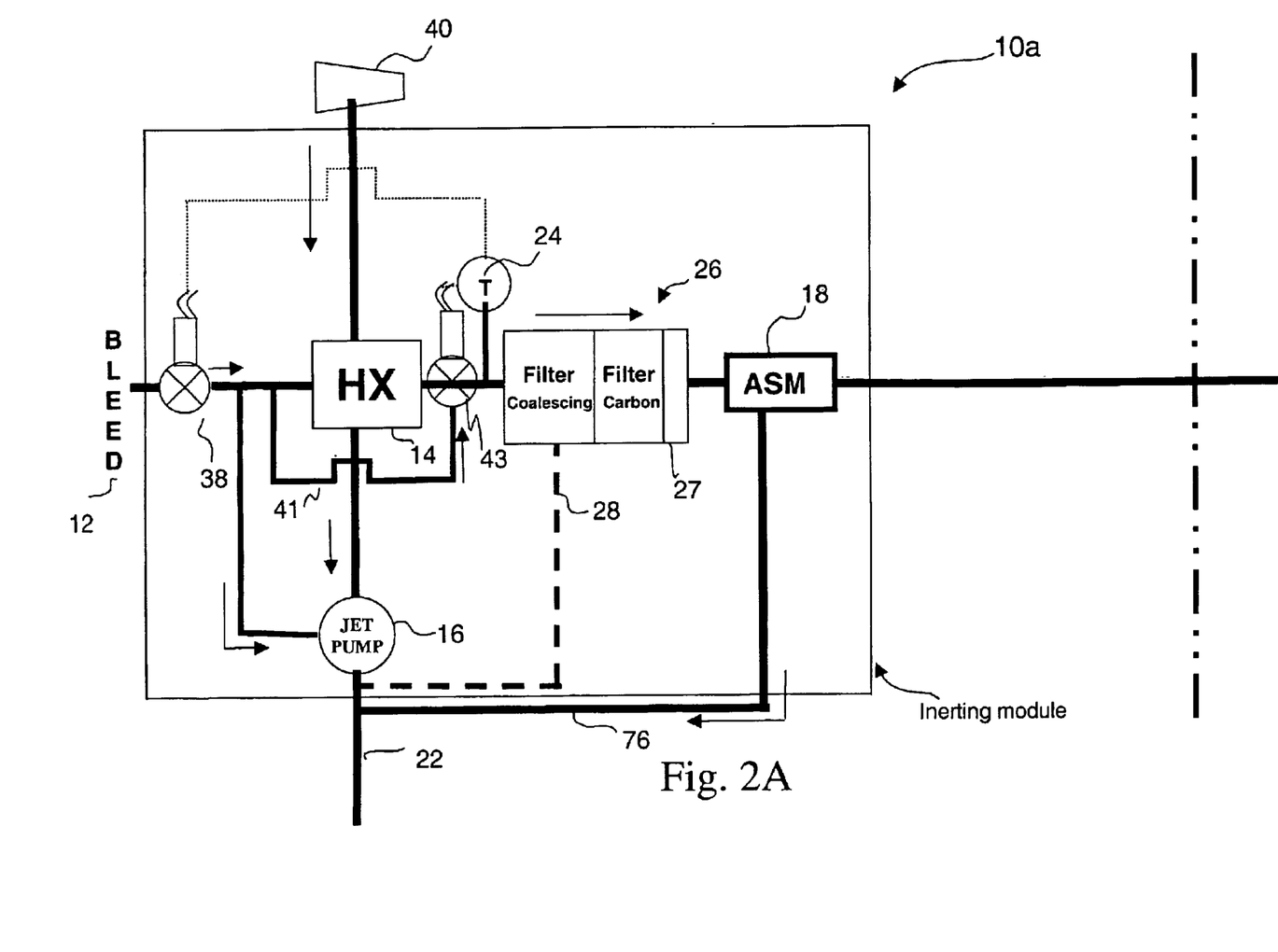
FIG. 2A is a schematic view of an alternative embodiment of the invention based on the embodiment in FIG. 2.

In FIG. 2A, an alternative embodiment of the invention uses primary heat exchanger bypass flow control to control the temperature of the air entering the ASM inlet. Bypass valve 43 controls the air flow going into heat exchanger 14. Bypass valve 43 modulates incrementally between being closed and directing all the air flow through heat exchanger 14 and being open, and allowing the unrestricted bypass of heat exchanger 14. The air flow allowed to bypasss heat exchanger 14 follows bypass conduit 41 to the air conduit upstream of temperature sensor 24 and filter 26. Temperature sensor 24 is, therefore positioned to determine the temperature of the air entering filter 26 and ASM 18. That temperature is used to direct bypass valve 43 to open and allow an appropriate amount of air to flow around heat exchanger 14 so that the temperature of the air entering filter 26 and ASM 18 is within a desired temperature range. Bypass valve 43 is preferably a phase-change direct acting mechanical sensor and flow control valve. Temperature modulation valve 42 (FIG. 1) and the corresponding control capability are added for additional temperature control if desired.

As also shown in FIG. 2A, filter 26 may include three sections. As previously described, filter 26 may contain a coalescing and solid containment HEPA filter section, for removing particles and water, and a carbon filter section for hydrocarbon removal. In this embodiment, the filter also includes an additional HEPA filter 27, similar to the first filter section, to prevent carbon filter bits from flaking off the previous filter section and traveling to ASM 18. Subcomponents downstream of ASM 18 may be eliminated as shown in FIG. 2A to reduce cost and complexity. In this embodiment the OEA outlet 76 exits the module to combine with the cooling air flow downstream of the jet pump 16. The filter drainpipe 28 also merges with the cooling air flow downstream of the jet pump 16, but does so within the modular assembly. The embodiments shown in FIG. 2A are otherwise as described with reference to FIG. 2.

Figure 3:
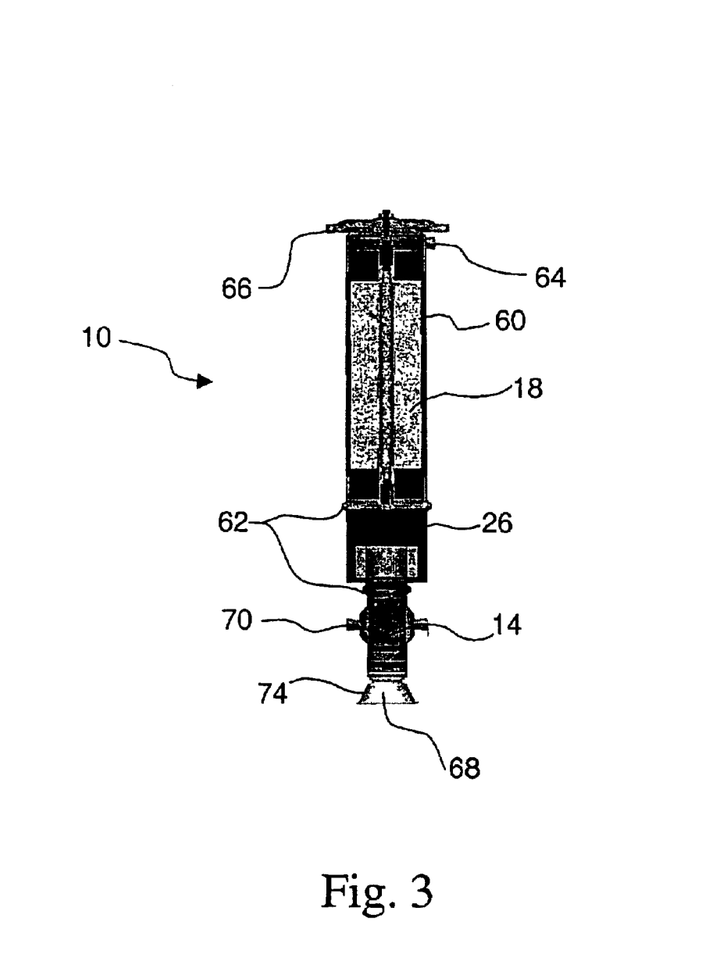
FIG. 3 is a cross-sectional view of a modular system according to the invention.
Figure 4:
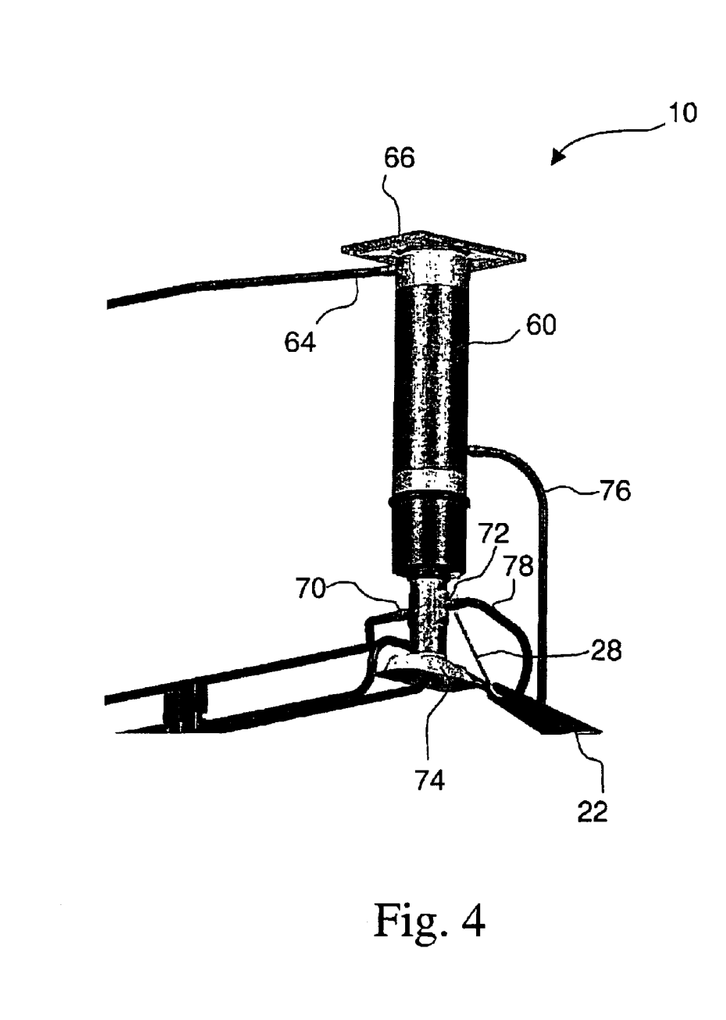
FIG. 4 is a perspective view of an embodiment of the invention.

In a further preferred embodiment of the invention, system 10 is provided as a modular assembly as shown in FIGS. 3 and 4. In one embodiment, components such as ASM 18, filters 26 and heat exchanger 14 are provided within common housing 60. Alternatively, housing 60 may encompass only the ASM and filters, with the heat exchanger mounted thereon to form a single modular unit. For example, band clamps 62 may be provided between ASM 18 and filter 26, and filter 26 and heat exchanger 14 to secure the components together.

At the outlet side, NEA outlet port 64 communicates with the fuel tank ullage. An upper mounting bracket 66 may be provided for securing the unit in an aircraft cargo hold or other appropriate space. At the inlet side, inlet 68 receives engine bleed air 12 and directs it toward heat exchanger 14. Secondary air inlet 70 provides a secondary cooling air flow and outlet 72 communicates with overboard outlet 22. Lower mount 74 also may be provided for securing the unit. As shown in FIG. 4, OEA outlet pipe 76, secondary air flow pipe 78 and filter drainpipe 28 all lead to overboard outlet 22. Oxygen and mass flow sensors may be provided as part of the modular unit, or separately provided, depending on space and installation requirements. Similarly, the orifice and associated control valve may be included in the modular system.

The single-housing design thus facilitates a simple, lightweight configuration that minimizes both acquisition and in-service costs by eliminating many of the sub-components of a typical military application. By eliminating sub-components the single-housing design will also minimize installation costs when compared to the current distributed component approach. The single-housing design also improves reliability. In preferred embodiments, the filter is arranged to be an easily replaceable, disposable cartridge.

Figure 3A:
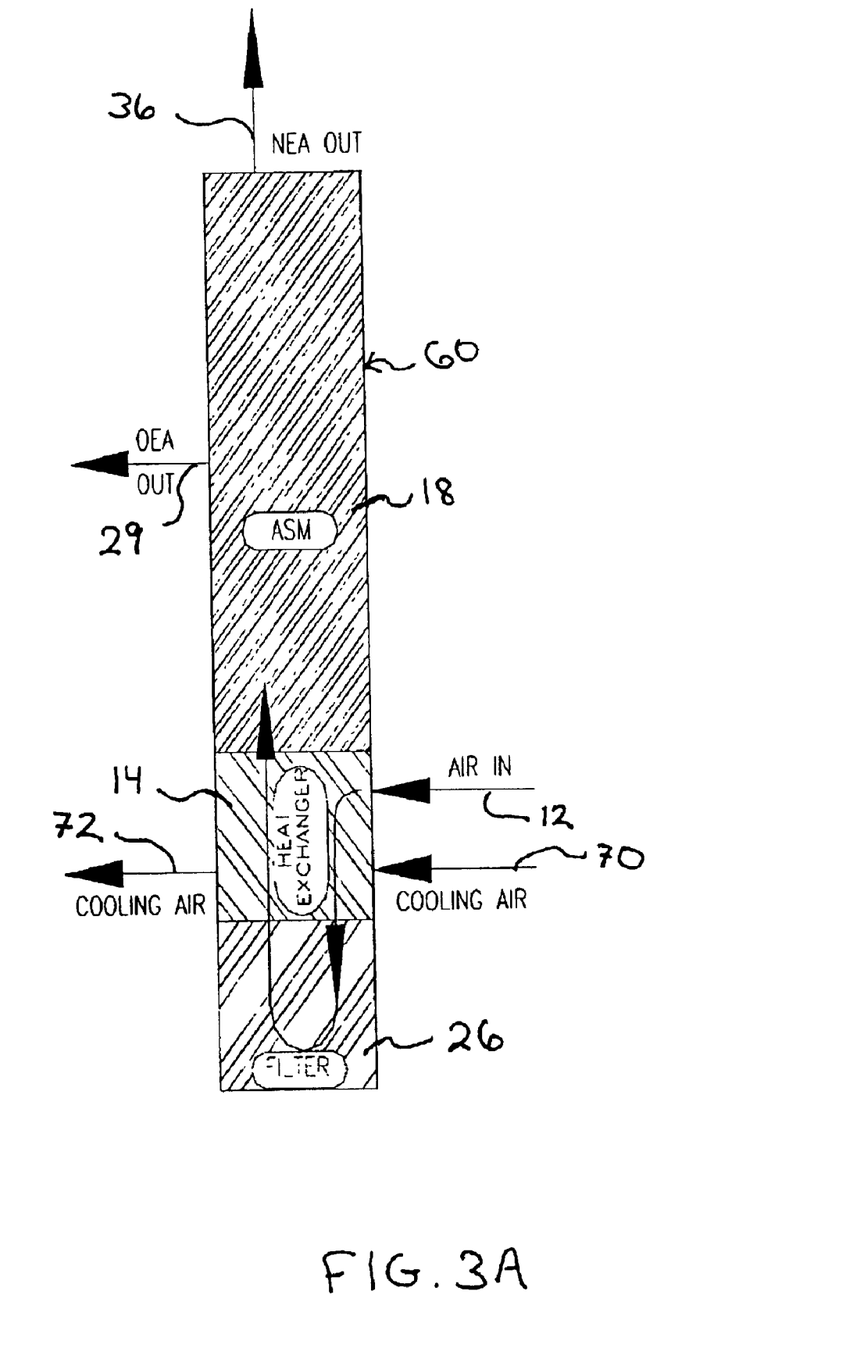
FIG. 3A is a cross-sectional view of another modular system according to the invention.

FIG. 3A shows an additional preferred embodiment of a modular assembly with components contained within a housing 60. In this embodiment, the arrangement of components ASM 18, filter 26, and heat exchanger 14 is changed so that heat exchanger 14 is between filter 26 and ASM 18. This provides better access to filter 26 for maintenance purposes. FIGS. 1 and 2 still describe the function of this embodiment, with the internal plumbing of the various air flows configured to accommodate the component arrangement in FIG. 3A.

Using the modular approach as described, a module may be designed to provide a particular, predetermined NEA flow rate (where a predetermined flow rate includes a predetermined range of flow rates) and multiple modules employed to meet higher flow rate requirements. For example, the individual module may be sized to meet the inerting requirements of a particular customer's smallest aircraft. For larger aircraft of the same customer, instead of redesigning and recertifying the module, multiple modules are employed to meet the higher flow rate requirements. In this manner, inventory and maintenance costs are reduced because only one type of equipment is required to service an entire fleet of aircraft of different sizes.

Figure 3B:
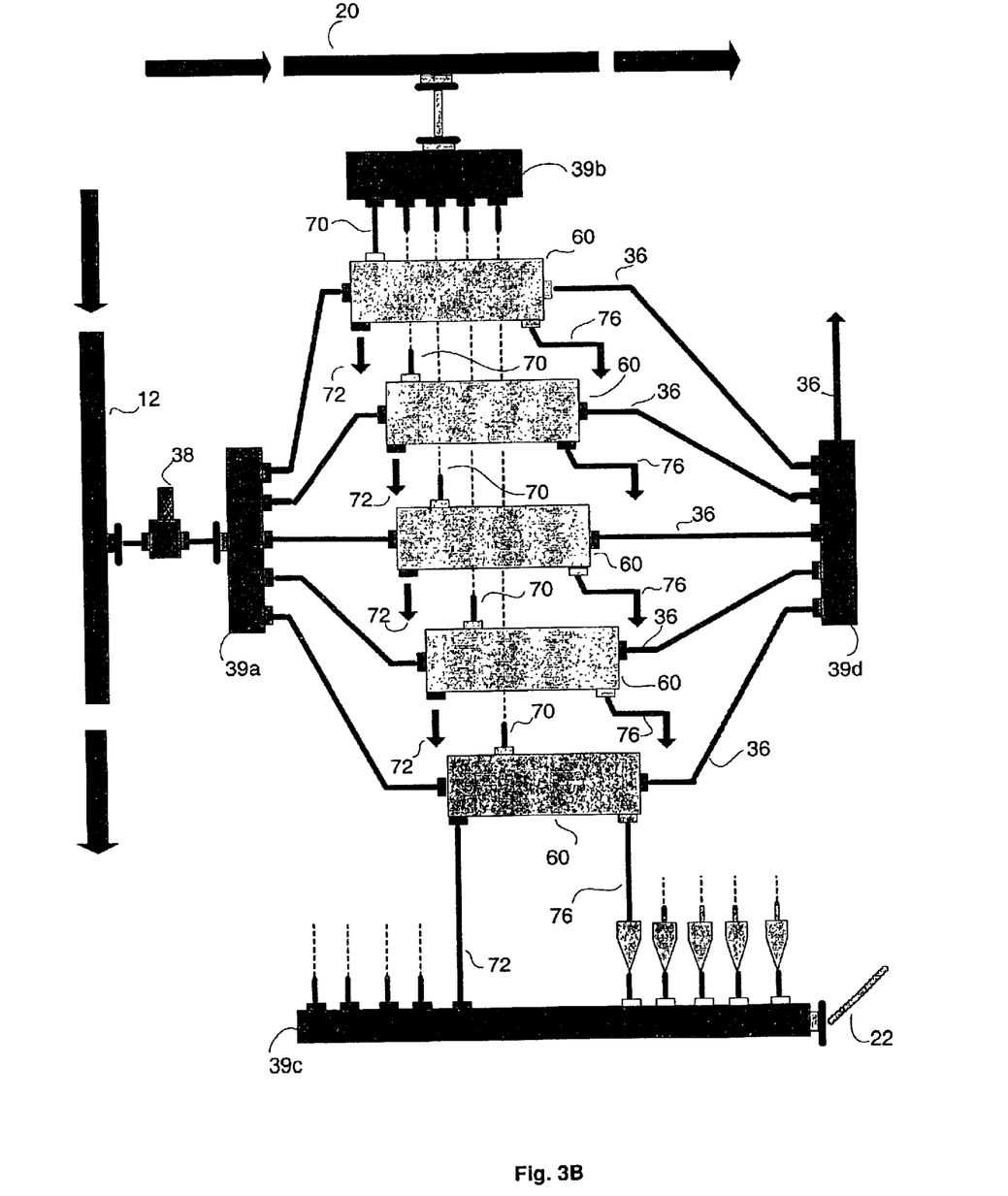
FIG. 3B is a schematic view of a modular system employing multiple modules according to the invention.

FIG. 3B shows a preferred embodiment of a modular assembly employing multiple modules. In this embodiment five housings 60 each contain an ASM 18, heat exchanger 14, and filter 26, as depicted in FIG. 3A. These housings are plumbed together in parallel. Bleed air 12 is provided to each heat exchanger 14 through a single isolation valve 38 and a manifold 39a. Similarly, manifold 39b provides cooling flow 20 to heat exchanger 14 and manifold 39c collects both the OEA and the post-heat exchanger cooling air flow and directs it overboard 22. NEA is collected by manifold 39d and directed to system outlet 36 and the fuel tank ullage.

A further embodiment of the invention boosts system flow performance by tapping bleed air from the high-pressure segment of the aircraft's Air Cycle Machine (ACM). Aircraft environmental control systems often use an air compressor to increase bleed air pressure and temperature in the ACM. This can be used alone or in conjunction with a turbocharger to apply a significantly higher pressure to the ASM. The higher pressure increases the flow and/or purity performance of the ASM, resulting in a smaller and less costly ASM for equivalent system performance. Alternatively, for larger aircraft, fewer ASM's may be required using this embodiment, again resulting in reduced costs and reduced complexity.

Figure 5:
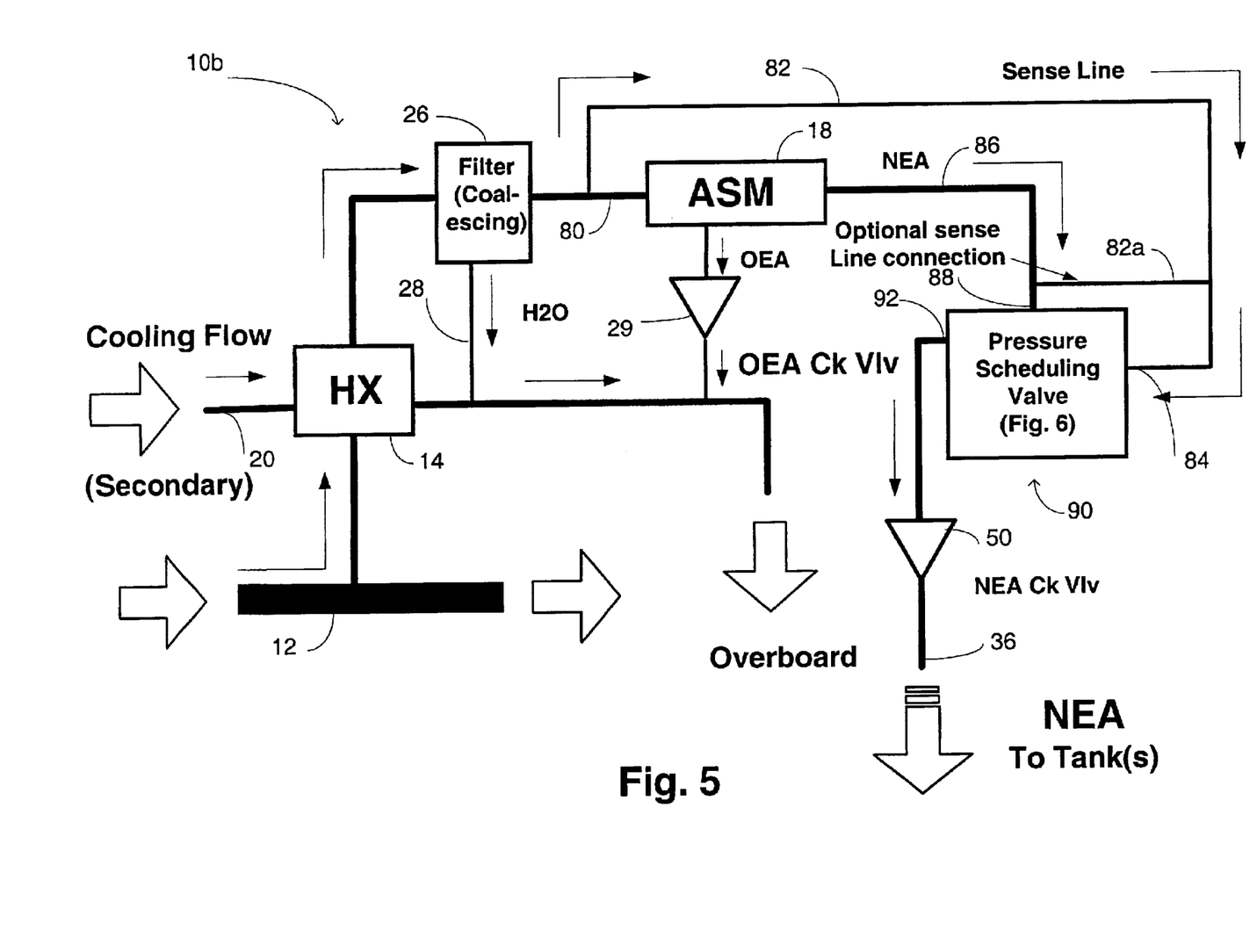
FIG. 5 is a schematic view of another alternative embodiment of the invention.

In an alternative embodiment illustrated in FIG. 5, a pressure scheduling valve 90 is provided to regulate the flow of NEA using a variable orifice whose size is varied based on the pressure of the bleed air supplied to ASM 18, or on the pressure of the NEA discharged from ASM 18. Pressure scheduling valve 90 works to increase NEA flow when bleed air supply pressure is relatively low and to decrease NEA flow when bleed air pressure is relatively high by varying an orifice between two pre-set limits. When the supply pressure is at the high limit, valve 90 produces an orifice that is at its smallest size. Conversely, when the supply pressure is at its low limit, valve 90 produces an orifice which is at its largest size. The pressure scheduling valve, therefore, replaces the function of the stepped-orifice flow controller, without the use of an electrical signal or power from the aircraft. As such, pressure scheduling valve 90 provides a predetermined range of flow and thus a predetermined range of NEA purity, which range may be selected by a person of ordinary skill in the art for a particular application.

As in FIG. 1, engine bleed air and secondary cooling air pass directly to heat exchanger 14. The secondary air flow again passes through heat exchanger 14, but then passes directly overboard through overboard outlet 22. Operation of filter 26 and ASM 18 is essentially as described above. Pressure scheduling valve 90 receives NEA from ASM 18 via an NEA supply line 86 through an NEA inlet 88. Pressure scheduling valve 90 taps into the supply pressure of bleed air through a sense line 82 and an inlet 84. Optionally, pressure scheduling valve 90 taps into the supply pressure of NEA through a sense line 82a. Either sense line 82, 82a supplies pressure scheduling valve 90 with a supply pressure that valve 90 can use to regulate NEA flow to check valve 50 and the tank ullage.

Figure 6:
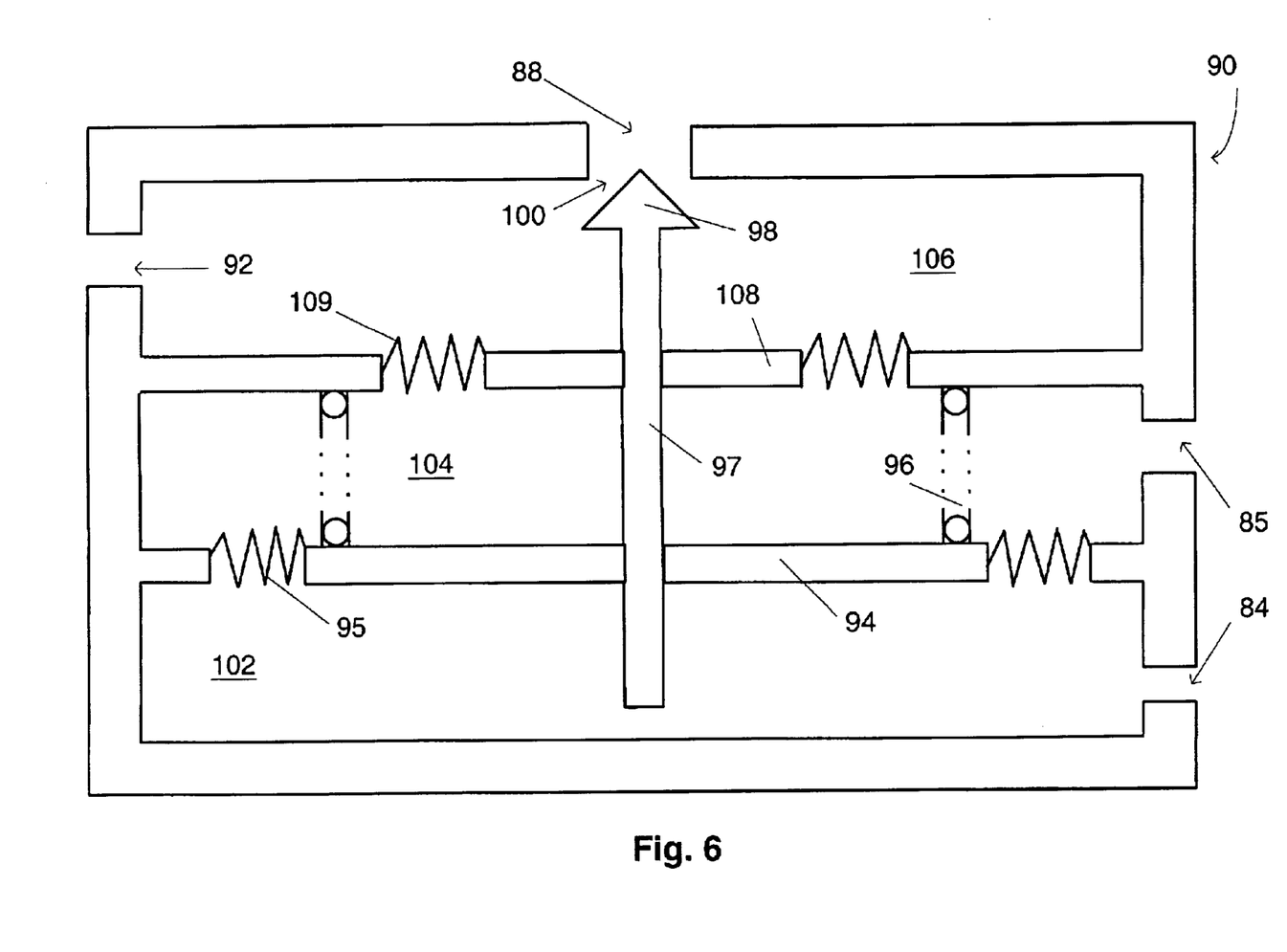
FIG. 6 is a schematic cross-sectional view of an embodiment of a pressure-scheduling valve employed in the embodiment of the invention depicted in FIG. 5.

Now referring to FIG. 6, NEA enters pressure scheduling valve 90 and an NEA chamber 106 through NEA inlet 88 and exits through an NEA outlet 92. Sense line 82 or 82a supplies bleed air supply pressure, or NEA supply pressure, respectively, through supply pressure inlet 84 to a supply chamber 102 to serve as an air pressure signal. An ambient pressure inlet 85 supplies ambient pressure to an ambient chamber 104.

Pressure scheduling valve 90 functions in the following manner. Generally, valve 90 compares the supply pressure against a reference pressure, with the difference in pressures causing an orifice to vary in size. Thus, when the supply pressure is relatively greater than the reference pressure, the orifice size will decrease, and vice versa.

In particular, valve 90 taps supply pressure at the inlet of ASM 18, or the NEA outlet of the ASM. The supply pressure ($P_1$) in supply chamber 102 is converted to an equivalent force by acting against piston 94. This equivalent force is balanced against a variable force from the combination of: spring 96; the ambient pressure ($P_2$) in chamber 104 acting against both pistons 94 ($A_1$) and 108 ($A_2$); the NEA pressure ($P_3$) in chamber 106 acting against piston 108 and against a flow control device 98 ($A_3$); and the NEA supply pressure ($P_4$) acting against flow control device 98. An extension 97 of piston 94 connects to a piston 108 and flow control device 98. Flow control device 98 may take a variety of structures as will be appreciated by one of skill in the art. For example a needle valve-like structure to form a variable orifice as in FIG. 6 or a stepped orifice as in FIG. 7, below.

Diaphragms 95 and 109 form part of chambers 102, 104, and 106 and permit pistons 94 and 108, respectively, to move. Spring 96 and pistons 94, 108 are designed to effectively vary the position of flow control device 98 in response to variations in the supply pressure ($P_1$). This variable position is subsequently converted to a variable orifice size. Flow control device 98 converts the variable piston position to a variable orifice 100 by blocking more of valve inlet 88 when the supply pressure ($P_1$) is relatively high. Thus, as illustrated, variable orifice 100 is annular, although other geometric configurations are within the scope of the invention. The position of flow control device 98, and therefore the size of variable orifice 100 is generally a function of $P_1$, $P_2$, $P_3$, and $P_4$, the areas of both pistons 94 ($A_1$), 108 ($A_2$), the area of flow control device 98 ($A_3$), and the characteristics of spring 96 (k), among other things, such as air velocity and friction effects. The position (X) of flow control device 98 is roughly represented by Eq. (1).

$$X = f[(1/k)[P_1 A_1 + P_2(A_2 - A_1) - P_3 A_2 + A_3(P_3 - P_4)]] \qquad \text{Eq. (1)}$$

Figure 7:
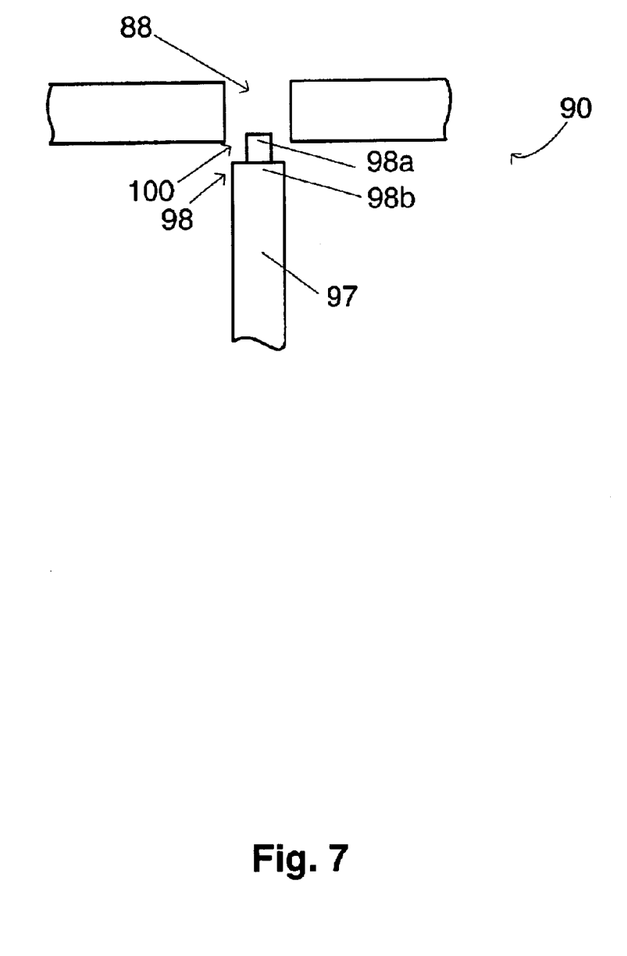
FIG. 7 is a schematic cross-sectional view of a stepped flow control device employed in an embodiment of the invention depicted in FIG. 6.

FIG. 7 is a cross-sectional view of a stepped flow control device, employed in an embodiment of the invention depicted in FIG. 6, that shuttles between a smaller and a larger annular orifice. Flow control device 98 includes a first cylinder 98a and a second cylinder 98b. Cylinders 98a and 98b both fit within valve inlet 88. During use, the position of flow control device 98 varies so that, when a relatively high NEA flow is desired, cylinder 98a is within inlet 88. Conversely, when a low NEA flow is desired, cylinder 98b is within inlet 88. Thus, variable orifice 100 steps between a larger to a smaller annular orifice and vice versa.

In an embodiment of the invention, spring 96 characteristics, such as the spring constant (k), together with the size of pistons 94, 108 (or equivalent), are optimized for each application. In a preferred embodiment of the invention, the diameter of piston 108 approaches zero, allowing piston 108 ($A_2$) to be reduced in size as much as possible. Accordingly, the size and weight (and the cost) of ASM 18 can be reduced by effectively "tuning" its NEA output to the demands of the aircraft, depending on its flight profile, and the available ASM inlet air pressure. In general, smaller OBIGGS are more readily installed, and are of reduced overall costs.

An additional feature of the invention is that pressure scheduling valve 90 adjusts itself without relying on complex control systems. The valve adjusts itself based on, and using, the pressure in chambers 102, 104, and 106. The valve does not rely on external control systems, or powered actuators. Thus, the valve simplifies the modular OBIGGS construction and installation, and improves its reliability.

Figure 8:
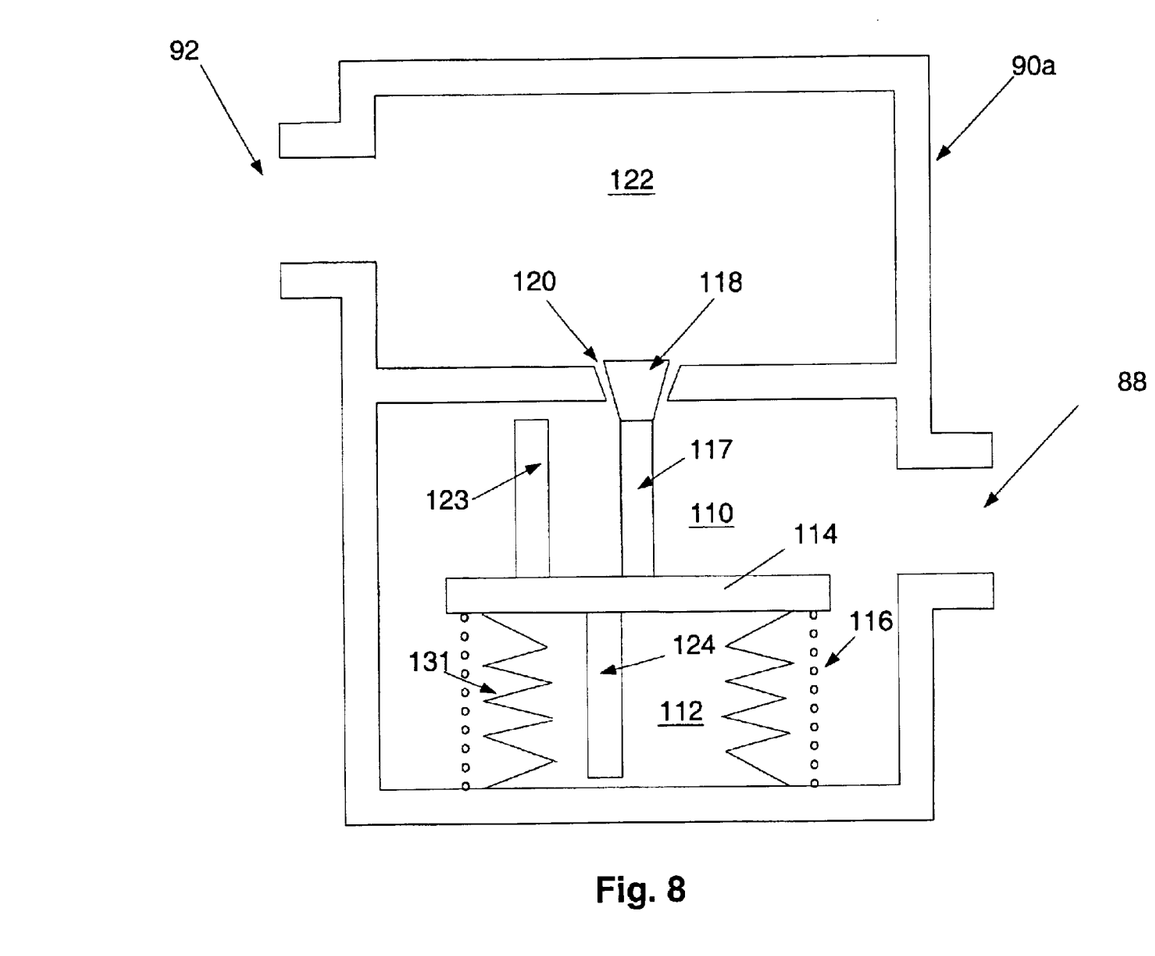
FIG. 8 is a schematic cross-sectional view of another embodiment of a pressure scheduling valve.

In FIG. 8, which is a schematic cross-sectional view of another embodiment of a pressure scheduling valve, NEA supply pressure enters chamber 110 of pressure scheduling valve 90a through NEA inlet 88, and exits through NEA outlet 92. Pressure scheduling valve 90a functions in the following manner. Bellows 131 and piston 134 create an expandable, sealed chamber 112, which contains a vacuum, inside chamber 110. Valve 90a receives NEA supply pressure through NEA inlet 88 from NEA supply line 86 (FIG. 5). The NEA supply pressure ($P_1$) in chamber 110 is converted to an equivalent force by acting against piston 114. This equivalent force is balanced against: a variable force from a spring 116; the NEA supply pressure ($P_1$) in chamber 110 acting against the flow control device 118; and the NEA scheduled pressure ($P_3$) in chamber 122 acting against the flow control device 118. An extension 117 of piston 114 connects to a flow control device 118.

Spring 116, piston 114, and flow control device 118 are designed to effectively vary the position of flow control device 118 in response to variations in the NEA supply pressure. This variable position is converted to a variable orifice 120. Variable orifice 120 schedules NEA flow by changing the orifice flow area; restricting the flow more when the NEA supply pressure is relatively high. The scheduled NEA flow passes into chamber 122, and then out of pressure scheduling valve 90a through outlet 92.

The position of flow control device 118, and therefore the size of variable orifice 120 is generally a function of the NEA supply pressure ($P_1$), the NEA scheduled pressure ($P_3$), the area of piston 114 ($A_4$), the area of flow control device 118 ($A_3$) and the characteristics of spring 116 (k), among other things, such as air velocity and friction effects. The position (X) of flow control device 118 is roughly represented by Eq. (2).

$$X=f[(1/k)(P_1A_4-P_1A_3+P_3A_3)] \qquad \text{Eq. (2)}$$

When $A_3$ is very small compared to $A_4$, the value of X can be approximated by Eq. (3).

$$X=f[(1/k)(P_1A_4)] \qquad \text{Eq. (3)}$$

As an option, the travel of flow control device 118 may be limited by one or both of stops 123 and 124.

Figure 9:
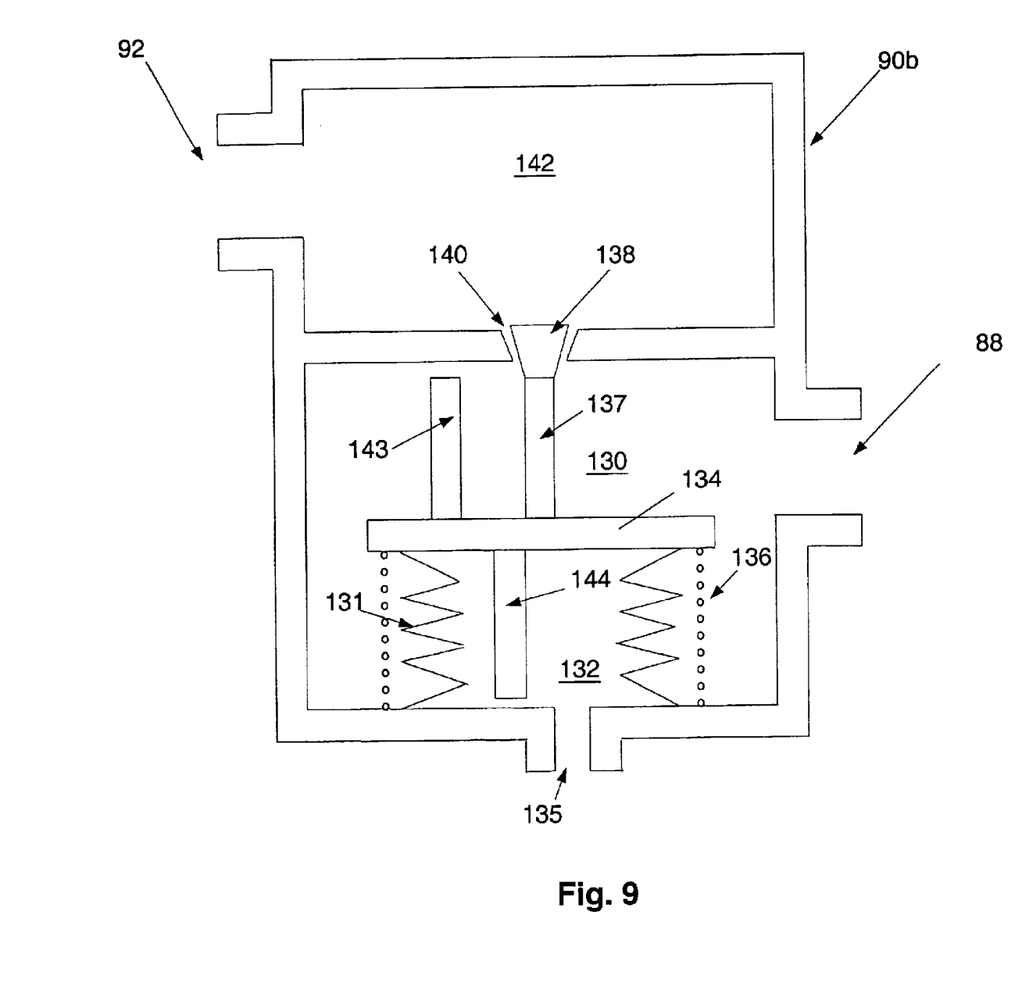
FIG. 9 is a schematic cross-sectional view of an additional embodiment of a pressure scheduling valve.

In FIG. 9, which is a schematic cross-sectional view of an additional embodiment of a pressure scheduling valve, NEA supply pressure enters chamber 130 of pressure scheduling valve 90b through NEA inlet 88, and exits through an NEA outlet 92. Pressure scheduling valve 90b functions in the following manner. Bellows 131 and piston 134 create an expandable, sealed chamber 132 inside chamber 130. Chamber 132 receives ambient pressure ($P_a$) through an ambient inlet 135. The NEA supply pressure ($P_1$) in chamber 130 is converted to an equivalent force by acting against piston 134. This equivalent force is balanced against: a variable force from spring 136; ambient pressured ($P_a$) acting against piston 134; the NEA supply pressure ($P_1$) in chamber 130 acting against the flow control device 138 ($A_3$); and the NEA scheduled pressure ($P_3$) in chamber 142 acting against the flow control device 138 ($A_3$). An extension 137 of piston 134 connects to a flow control device 138.

Spring 136 and piston 134 are designed to effectively vary the position of flow control device 138 in response to variations in the NEA supply pressure ($P_1$). This variable position is subsequently converted to a variable orifice size. Flow control device 138 converts the variable piston position to a variable orifice 140, which schedules NEA flow by changing the orifice flow area; restricting the flow more when the supply pressure ($P_1$) is relatively high. The scheduled NEA flow passes into chamber 142, and then out of pressure scheduling valve 90b through outlet 92. The position of flow control device 138 and therefore the size of variable orifice 140 is generally a function of the NEA supply pressure ($P_1$), the NEA scheduled pressure ($P_3$), the area of piston 134 ($A_5$), the area of flow control device 138 ($A_3$), and the characteristics of spring 136 (k), among other things, such as air velocity and friction effects. The position (X) of flow control device 138 is roughly represented by Eq. (4).

$$X=f[(1/k)(P_1A_5-P_aA_5-P_1A_3+P_3A_3)] \qquad \text{Eq. (4)}$$

When $A_3$ is very small compared to $A_5$ the value of X can be approximated by Eq. (5).

$$X=f[(1/k)(P_1A_5-P_aA_5)] \qquad \text{Eq.(5)}$$

As an option, the travel (X) of flow control device 138 may be limited by one or both of stops 143 and 144.

In the aforementioned embodiments of the invention, spring characteristics, such as the spring constant (k), together with the areas of the pistons and flow control devices 138, are optimized for each application. Accordingly, the size and weight (and the cost) of ASM 18 can be reduced by effectively "tuning" its NEA output to the demands of the aircraft, depending on its flight profile, and the available ASM inlet air pressure.

Figure 10:
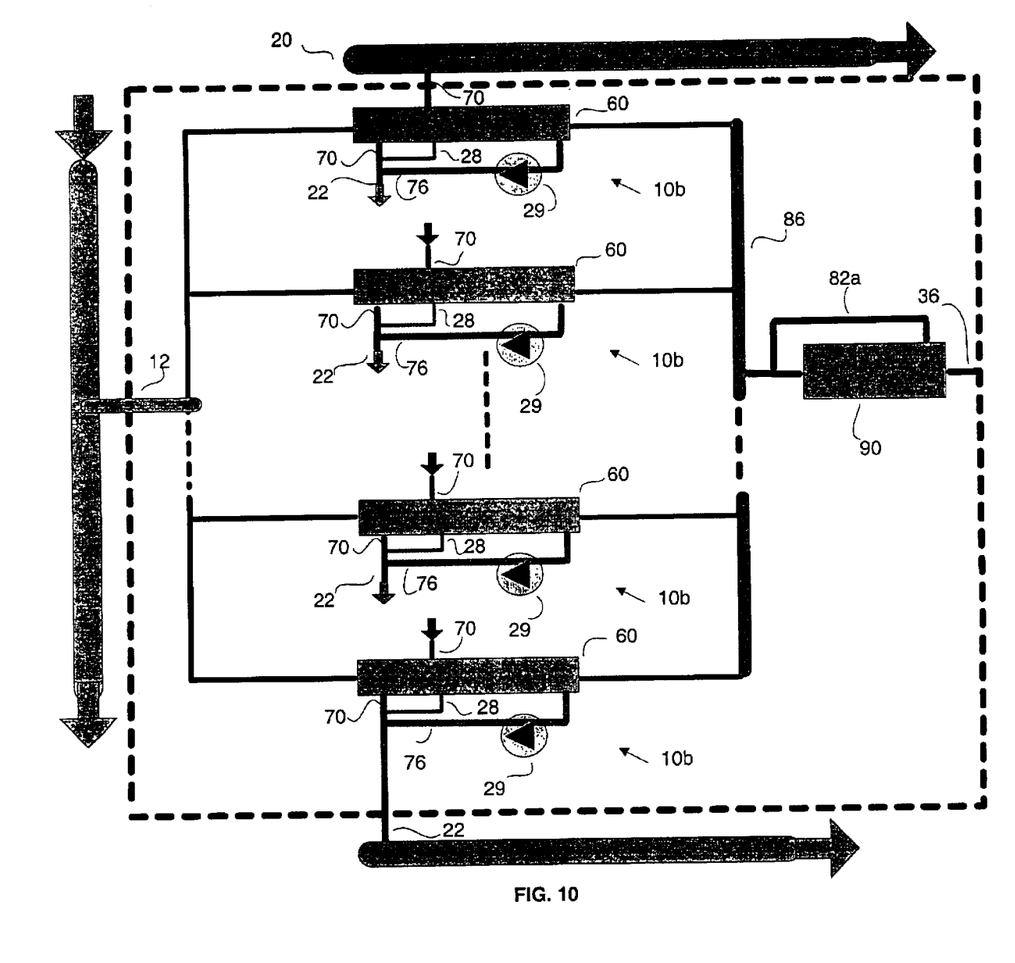
FIG. 10 is a schematic view of a modular system employing multiple modules with a single pressure scheduling valve, according to the invention.

In FIG. 10, pressure scheduling valve 90 has been incorporated into a modular system employing multiple modules, similar to the modular system shown in FIG. 3B. This embodiment shows four systems 10b plumbed together in parallel with the combined flows of NEA 86 sent to a common pressure scheduling valve 90. Each housing 60 contains an ASM 18, heat exchanger 14, and filter 26, which function as described previously to produce a flow of NEA. In this embodiment, pressure scheduling valve 90 varies the orifice size based on the pressure in sense line 82a of the NEA discharged from the combination of the five ASMs 18, as discussed in detail above. Bleed air 12 is provided to each heat exchanger 14 (FIG. 3A). Cooling flow 20 is provided to each heat exchanger 14 through inlets 70. OEA and the post-heat exchanger cooling air flow are combined and directed overboard 22. One of ordinary skill in the art will understand than other numbers of systems 10b could be used, depending on the requirements of the aircraft.

The apparatus and method of the present invention provide a more satisfactory OBIGGS for a number of reasons. The modular approach to the design of the equipment reduces acquisition and installation costs. The cartridge-style filter with quick-release installation features, together with high OBIGGS reliability due to reduced complexity, also reduces operational costs. The methodology of increasing NEA purity in the tank ullage during cruise, together with increased flow/lower purity NEA injection during descent gives all of the benefits of a traditional OBIGGS system with a much smaller, lighter, less costly, more reliable system. The pressure scheduling valve provides effective flow control at the ASM outlet, without using electrical power or electrical signals. This reduces both system costs and system complexity.

We claim:

1. An inerting system, comprising:
   an air separation module configured and dimensioned to communicate with an upstream source of pressurized air and to generate a downstream flow of nitrogen-enriched air; and
   a pressure scheduling valve disposed in the nitrogen-enriched air flow to control the flow rate thereof based on an air pressure signal indicative of the pressure of said pressurized air source.

2. The system of claim 1, wherein said pressure scheduling valve includes a variable orifice capable of varying the flow rate, thereby varying oxygen level in the nitrogen-enriched airflow from the air separation module.

3. The system of claim 2, wherein said air pressure signal is provided from a point downstream of said air separation module.

4. The system of claim 2, wherein said air pressure signal is provided from a point upstream of said air separation module.

5. The system of claim 4, wherein said pressure scheduling valve also varies said variable orifice based on a second air pressure signal from a point downstream of said air separation module.

6. The system of claim 2, wherein:
   said variable orifice varies from a smallest orifice size to a largest orifice size; and
   said smallest orifice size corresponds to an upper value of said air pressure signal and said largest orifice size corresponds to a lower value of said air pressure signal.

7. The system of claim 2, wherein said pressure scheduling valve comprises:
   a valve body defining an opening for said variable orifice;
   a first piston defining a first chamber between said piston and the valve body;
   a second piston defining a second chamber between said second piston and the first piston and the valve body and a third chamber between said second piston and the valve body;
   a spring biasing the second piston in a direction away from the first piston; and
   a member extending from the first piston and cooperating with said opening to form the variable orifice.

8. The system of claim 7, wherein said pressure scheduling valve further comprises:
   a second opening defined in said valve body and accessing said second chamber; and
   a third opening defined in said valve body and accessing said third chamber, wherein:
   said supply air pressure enters said third chamber through said third opening and acts against said second piston in a first direction;
   an ambient pressure enters said second chamber through said second opening, acts against said second piston in a second direction, and acts against said first piston in said first direction;
   a nitrogen-enriched air pressure enters said first chamber through said variable orifice and acts against said first piston in said second direction;
   said spring acts against said second piston in said second direction;
   said first piston, said second piston, and said spring are sized to cause said flow control device to vary said variable orifice from a smallest orifice size to a largest orifice size; and
   said smallest orifice size corresponds to an upper value of said first pressure and said largest orifice size corresponds to a lower value of said first pressure.

9. The system of claim 7, wherein said first piston, said second piston, and said spring are sized to deliver said flow rate and said oxygen purity level sufficient to meet a nitrogen-enriched flow requirement for inerting a space.

10. The system of claim 2, wherein said pressure scheduling valve comprises:
    a valve body defining an opening for the variable orifice and an inlet for the pressurized air;
    a first chamber, defined by a first section of the valve body, a first piston, and a bellows;
    a second chamber, defined by a second section of the valve body, the first piston, and the bellows, and containing a second chamber pressure, wherein the first chamber encompasses the second chamber;
    a spring acting against the first piston in a first direction, tending to expand the second chamber; and
    a member extending from the first piston and cooperating with said opening to form the variable orifice, wherein:
    a nitrogen-enriched air pressure enters said first chamber through said inlet and acts against the first piston in opposition to the spring;
    the second chamber pressure acts in concert with the spring against the first piston;
    the first piston and the spring are sized to cause the flow control device to vary the variable orifice from a smallest orifice size to a largest orifice size based on the nitrogen-enriched air pressure and the second chamber pressure; and
    the smallest orifice size corresponds to an upper nitrogen-enriched air pressure and the largest orifice size corresponds to a lower nitrogen-enriched air pressure.

11. The system of claim 10, wherein the second chamber pressure is a vacuum.

12. The system of claim 10, wherein the second chamber comprises an opening to ambient pressure defined in said valve body and wherein said second chamber pressure is ambient pressure.

13. The system of claim 1, further comprising a filter configured to be connected to the source of pressurized air, disposed between said air separation module and said source.

14. The system of claim 13, further comprising a heat exchanger disposed between said source of pressurized air and the filter.

15. The system of claim 14, wherein at least said filter and air separation module are contained within a common housing to define a modular unit.

16. The system of claim 15, comprising at least one said modular unit, wherein the modular unit is configured to receive engine bleed air from an aircraft and to deliver a flow of nitrogen-enriched air to an aircraft space to be inerted, said at least one modular unit being mounted in the aircraft and communicating with said space in a number sufficient in combination to meet a nitrogen-enriched flow requirement for inerting said space, said flow and oxygen level in said flow being varied by the pressure scheduling valve to optimize said inerting.

17. A method for inerting void spaces in aircraft, the aircraft having an inert gas requirement for said inerting, the method comprising:
    providing at least one modular unit capable of producing a flow of nitrogen-enriched air at a variable flow rate and variable oxygen purity level;

controlling the flow rate from the modular unit to control the oxygen purity level within predetermined ranges;

mounting in said aircraft a number of said modular units sufficient to meet the aircraft inert gas requirement with a combination of said flow rates;

connecting said modular units to a source of air; and connecting an output of each of said modular units to the space to be inerted.

18. The method of claim 17, wherein said source of air is a source of engine bleed air.

19. The method of claim 18, wherein each said modular unit comprises:

a filter configured to receive the engine bleed air;

an air separation module communicating with the filter to produce said nitrogen-enriched air flow; and a pressure scheduling valve, said pressure scheduling valve comprising a variable orifice disposed in said nitrogen-enriched air flow, said variable orifice causing a variable flow rate and variable oxygen purity level.

20. The method of claim 18, further comprising cooling said engine bleed air.

21. The method of claim 20, further comprising pumping a source of secondary cooling air with a jet pump, and driving said jet pump with engine bleed air.

22. The method of claim 20, further comprising forcing said source of secondary cooling air through a heat exchanger with a ram air scoop.

23. The method of claim 20, further comprising forcing said source of secondary cooling air through a heat exchanger with a NACA scoop.

24. The method of claim 20, further comprising sizing the modular units to meet said aircraft inert gas requirement without sensing temperature of air flow through said units.

25. The method of claim 19, further comprising varying said variable orifice based on a supply air pressure.

26. The method of claim 25, further comprising tapping said supply air pressure from a point downstream of said air separation module.

27. The method of claim 25, further comprising tapping said supply air pressure from a point upstream of said air separation module.

28. The method of claim 27, further comprising varying said variable orifice based on a second supply air pressure tapped from a point downstream of said air separation module.

29. The method of claim 25, further comprising varying said variable orifice from a smallest orifice size to a largest orifice size, and wherein said smallest orifice size corresponds to an upper value of said supply air pressure and said largest orifice size corresponds to a lower value of said supply air pressure.

* * * * *